US009819096B2

(12) United States Patent
Veihl et al.

(10) Patent No.: US 9,819,096 B2
(45) Date of Patent: Nov. 14, 2017

(54) ACTIVE ANTENNA SUB-ARRAY STRUCTURES

(75) Inventors: Jonathon C. Veihl, New Lenox, IL (US); Simon H. Hamparian, Emerson, NJ (US); Jonas Aleksa, Exeter, NH (US); Kevin E. Linehan, Rowlett, TX (US)

(73) Assignee: CommScope Technologies LLC, Hickory, NC (US)

(*) Notice: Subject to any disclaimer, the term of this patent is extended or adjusted under 35 U.S.C. 154(b) by 754 days.

(21) Appl. No.: 13/538,883

(22) Filed: Jun. 29, 2012

(65) Prior Publication Data
US 2013/0171946 A1 Jul. 4, 2013

Related U.S. Application Data

(60) Provisional application No. 61/503,465, filed on Jun. 30, 2011, provisional application No. 61/535,701, filed on Sep. 16, 2011.

(51) Int. Cl.
*H01Q 21/06* (2006.01)
*H04B 1/38* (2015.01)
(Continued)

(52) U.S. Cl.
CPC ......... *H01Q 21/0006* (2013.01); *H01Q 3/267* (2013.01); *H01Q 21/26* (2013.01); *H04B 1/38* (2013.01)

(58) Field of Classification Search
USPC ............... 343/853; 455/73, 561, 562.1, 63.1, 455/67.16; 342/372, 373
See application file for complete search history.

(56) References Cited

U.S. PATENT DOCUMENTS 4,276,551 A * 6/1981 Williams et al. ............. 342/375
5,079,557 A * 1/1992 Hopwood et al. ............ 342/373
(Continued)

FOREIGN PATENT DOCUMENTS

EP 2 107 637 A1 7/2009
EP 2 221 924 A2 8/2010
(Continued)

OTHER PUBLICATIONS

Notification of Transmittal of The International Search Report and the Written Opinion of the International Searching Authority, or the Declaration for related PCT App. No. PCT/US2012/044952 dated Jan. 24, 2013.
(Continued)

*Primary Examiner* — Nay A Maung
*Assistant Examiner* — Erica Fleming-Hall
(74) *Attorney, Agent, or Firm* — Myers Bigel, P.A.

(57) ABSTRACT

An antenna comprising a plurality of sub-arrays and methods and structure for restoring performance after a transceiver failure is provided. Each sub-array may include a power divider/combiner network, a first radiating element coupled to a first port of the power divider/combiner network, a second radiating element coupled to a second port of the power divider/combiner network, and a transceiver coupled to a third port of the power divider/combiner network. An adjustable power supply may be coupled to each transceiver, the adjustable power supply having current monitors to detect at least one failure state of a transceiver, and a power compensation mode to increase absolute power to a transceiver in a non-failed state. The adjustable power supply provides a first voltage in normal operation and a second voltage, where the second voltage is higher than the first voltage in power compensation mode.

12 Claims, 17 Drawing Sheets

(51) Int. Cl.
*H01Q 21/00* (2006.01)
*H01Q 21/26* (2006.01)
*H01Q 3/26* (2006.01)

(56) References Cited

U.S. PATENT DOCUMENTS

| | | | | |
|---|---|---|---|---|
| 6,124,827 | A * | 9/2000 | Green et al. | 342/375 |
| 6,526,102 | B1 * | 2/2003 | Piirainen | H04W 52/346 375/146 |
| 7,039,363 | B1 * | 5/2006 | Kasapi | H04B 7/0854 370/347 |
| 7,280,848 | B2 * | 10/2007 | Hoppenstein | 455/561 |
| 2003/0139198 | A1 * | 7/2003 | Johannisson | H01Q 1/246 455/525 |
| 2004/0203528 | A1 * | 10/2004 | Ammar et al. | 455/90.3 |
| 2008/0007453 | A1 * | 1/2008 | Vassilakis | H01Q 1/246 342/368 |
| 2008/0039129 | A1 * | 2/2008 | Li | H04L 1/0003 455/522 |
| 2008/0246663 | A1 | 10/2008 | Fox | |
| 2008/0297425 | A1 * | 12/2008 | Axton | H01Q 1/125 343/761 |
| 2009/0009391 | A1 * | 1/2009 | Fox et al. | 342/372 |
| 2009/0061789 | A1 | 3/2009 | Howard et al. | |
| 2009/0243931 | A1 * | 10/2009 | Weckerle | H01Q 1/246 342/372 |
| 2010/0214170 | A1 * | 8/2010 | Quan | 342/374 |
| 2010/0283674 | A1 * | 11/2010 | Kirk | G01S 19/40 342/357.25 |
| 2011/0150050 | A1 * | 6/2011 | Trigui et al. | 375/219 |
| 2011/0248796 | A1 * | 10/2011 | Pozgay | 333/137 |
| 2012/0020392 | A1 * | 1/2012 | O'Keeffe | H01Q 3/267 375/221 |
| 2012/0115548 | A1 * | 5/2012 | Shimizu et al. | 455/562.1 |
| 2012/0196545 | A1 * | 8/2012 | Schmidt | H01Q 1/246 455/73 |
| 2012/0250534 | A1 * | 10/2012 | Langer | H04B 17/13 370/252 |

FOREIGN PATENT DOCUMENTS

| | | |
|---|---|---|
| GB | 2 393 580 A | 3/2004 |
| JP | 10-065439 | 3/1998 |
| WO | WO 2004/064197 A1 | 7/2004 |

OTHER PUBLICATIONS

Communication regarding related EP patent 272184, dated Dec. 4, 2014 (9 pgs.).

International Preliminary Report on Patentability dated Jan. 7, 2014 for related PCT application No. PCT/US2012/044952.

* cited by examiner

ACTIVE ANTENNA SUB-ARRAY STRUCTURES

CROSS-REFERENCE TO RELATED APPLICATION

The present invention claims priority to U.S. Provisional Patent Application No. 61/503,465, filed on Jun. 30, 2011 titled: "Active Antenna Radiating Element Transceiver Sharing," and to U.S. Provisional Patent Application No. 61/535,701, filed on Sep. 16, 2011 titled: "Active Antenna Systems Having Sub-Arrays and Related Methods."

FIELD OF INVENTION

This invention related to antenna arrays. In particular, it relates to the grouping of radiating elements into sub-arrays and the operation of such sub-arrays.

BACKGROUND

The Radio Frequency (RF) front end of an active antenna typically includes one or more arrays of radiating antenna elements. In a typical active antenna physical architecture, there is a one-to-one correspondence of radiating elements and transceivers, so a single transceiver would be coupled to a single radiating antenna element. Examples of active antennas include U.S. Patent Pub. No.: 2011/0032158, titled: PANEL ANTENNA HAVING SEALED RADIO ENCLOSURE, the disclosure of which is incorporated by reference.

An example of a conventional active antenna is illustrated in FIG. 1. In this example, an array of radiating elements is cross polarized. An array of ten +45 degree polarized radiating elements 12 and an array of ten −45 degree polarized radiating elements is illustrated. In this conventional structure, a transceiver is associated with each radiating element. The phase (degree of advance or delay for an RF signal) may be individually configured for each radiating element. In this example, there would be twenty transceivers 16 in typical active antenna architecture.

Such active antenna systems are often mounted at the top of towers. As it can be very expensive and/or dangerous to climb towers to repair or replace failed equipment, it may be desirable to provide an active antenna system that can withstand the loss of, for example, one of the transceivers that powers an individual antenna element or a sub-array.

Certain antenna beam characteristics may be controlled by adjusting the phase angles and power levels supplied to each antenna radiating element. For example, advancing a phase angle of radiating elements at the top of the array, while delaying phase angle at the bottom of the array, may steer the beam pattern downward. Adjusting relative power distribution (e.g., tapered at top and bottom) may also provide desired beam shaping and reduce side lobe formation. The transceivers are controlled to provide the desired phase and power relationships.

A disadvantage of known active antennas is that the one-to-one relationship between transceivers and radiating elements results in expensive antennas with high power consumption. An additional disadvantage is that a failure of a single transceiver may cause the array as a whole to operate out of compliance with specifications, even if the receiving transceivers and radiating elements are operating normally. Accordingly, an object of the present invention is to provide structure and methods of operation which reduce cost, provide more efficient operation, and restorable performance in the case of a loss of a transceiver.

SUMMARY

An antenna comprising a plurality of sub-arrays and methods and structure for restoring performance after a transceiver failure is provided. Each sub-array may include a power divider/combiner network, a first radiating element coupled to a first port of the power divider/combiner network, a second radiating element coupled to a second port of the power divider/combiner network, and a transceiver coupled to a third port of the power divider/combiner network. A first sub-array of the plurality of sub-arrays may be located at a first end of the antenna, and a second sub-array of the plurality of sub-arrays may be located at a second end of the antenna. The antenna may include additional sub-arrays located between the first and second sub-arrays, may include single radiating elements located between the first sub-array and the second sub-array, or a combination of single radiating elements and additional sub-arrays.

The sub-arrays may comprise two, three, or more radiating elements. Phase differences may be applied within a sub-array.

The antenna may further include an adjustable power supply coupled to each transceiver, the adjustable power supply having current monitors to detect at least one failure state of a transceiver, and a power compensation mode to increase absolute power to a transceiver in a non-failed state. The adjustable power supply provides a first voltage in normal operation and a second voltage, where the second voltage is higher than the first voltage in power compensation mode.

In an another example, an antenna may include a combining network having a plurality of ports, a first transceiver coupled to a first port of the combining network, a second transceiver coupled to a second port of the combining network, a first radiating element coupled to a third port of the combining network, and a second radiating element coupled to a fourth port of the combining network. The radiating elements may comprise a sub-array of radiating elements.

A method of controlling the radiating pattern of an antenna is also provided. In this example, the antenna comprises an array of radiating elements driven by a first plurality of transceivers. The method comprises the steps of a. detecting a failure of one of the plurality of transceivers, b. adjusting phase coefficients of a second plurality of transceivers, the second plurality of transceivers comprising a subset of the first plurality of transceivers, and c. increasing the absolute power level provided by the second plurality transceivers. The method may further comprise the step of adjusting relative power levels of the second plurality of transceivers.

The step of detecting a failure of one of the first plurality of transceivers may include a power supply detecting one of a short circuit condition and an open circuit condition. The step of increasing the absolute power level provided by the second plurality transceivers may further comprise a. increasing the power level input to the RF stage of each of the second plurality of transceivers; and b. increasing the voltage supplied to the power amplifier of each of the second plurality of transceivers. The second plurality of transceivers may comprise all of the first plurality of transceivers except for the transceiver detected to be in a failed state.

The array of radiating elements may comprise at least one sub-array driven by a common transceiver. Alternatively, all of the first plurality of transceivers may be associated with a sub-array of radiating elements.

DETAILED DESCRIPTION

Figure 1:
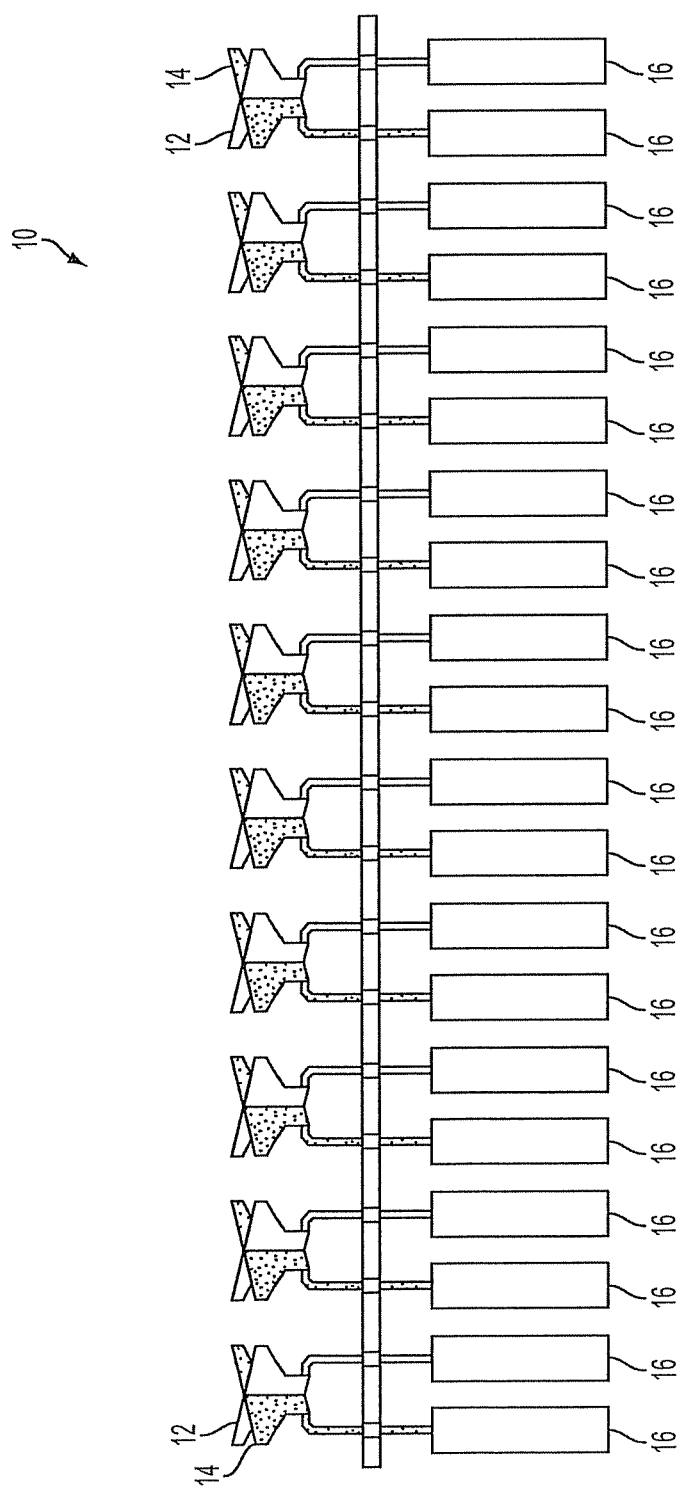
FIG. 1 illustrates a conventional active antenna array structure.
Figure 2:
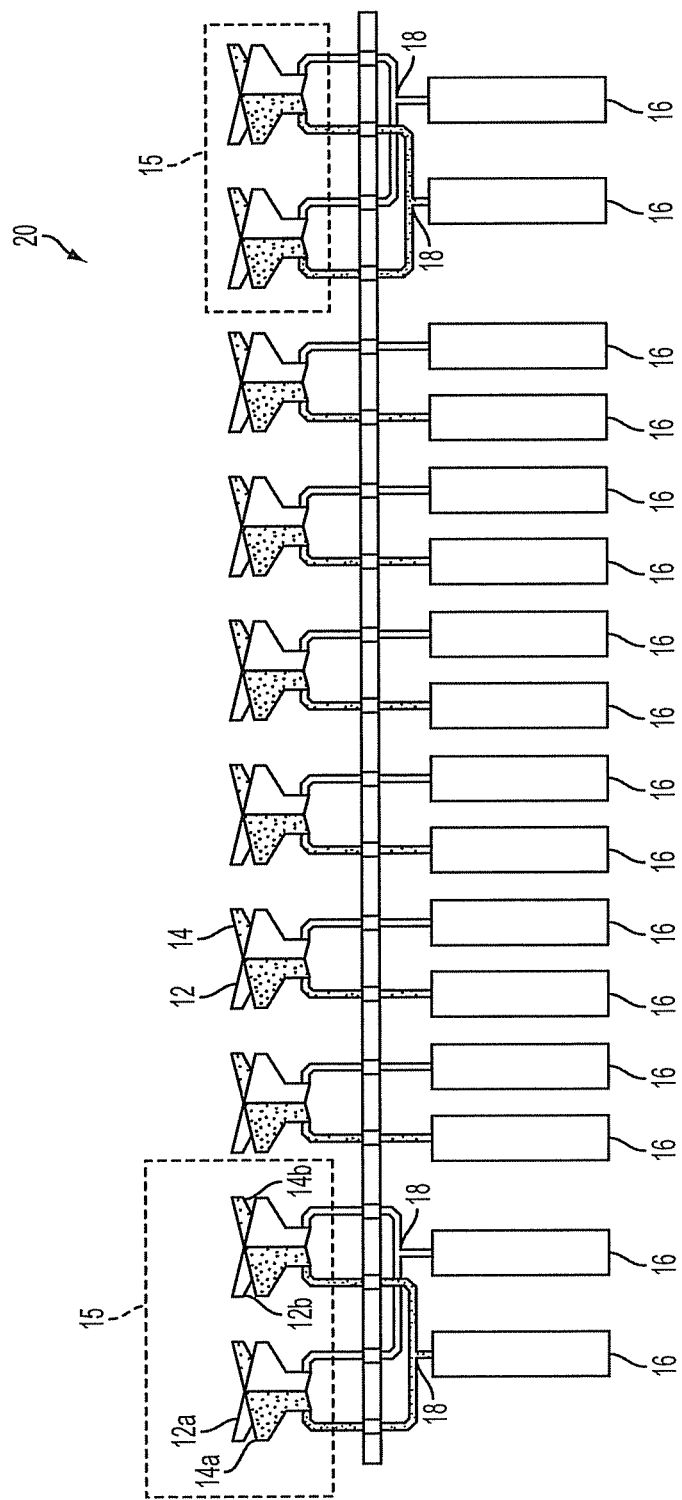
FIG. 2 illustrates an active antenna having a sub-array according to a first example of the present invention.

Referring to FIG. 2, one aspect of the invention comprises having an individual transceiver module being shared by multiple radiating antenna elements. A group of multiple radiating elements can also be referred to as a sub-array of radiating elements. In one example, a single transceiver may be connected to a sub-array of radiating antenna elements. Referring to FIGS. 4a-4d, the sub-array typically consists of 2 or 3 radiating antenna elements but may also consist of 4 or more.

In one example, illustrated in FIG. 2, sub-arrays of +45 degree radiating elements 12a may be located at the ends of an active antenna. As illustrated, the sub-arrays may include two radiating elements. Each sub-array may be coupled to a transceiver 16 through a power dividing network 18. In this example, there would also be sub-arrays of −45 degree radiating elements 14a may be located at the ends of an active antenna, with each sub-array coupled to a transceiver through a power dividing network 18. Radiating elements in the middle of the antenna may be coupled to individual transceivers 16.

This example may be advantageous in configurations where the radiating elements at the ends of the antenna transmit less power than the radiating elements in the middle of the antenna. In such examples, the transceivers coupled to the radiating elements at the end of the antenna would be operating at less than their full power rating. While the shared transceivers 16 may drive more radiating elements than the non-shared transceivers, because of the location of the radiating elements at the end of the antennas, the total power demand on the transceivers coupled to the sub-arrays is comparable to the power demand on the transceivers coupled to individual radiating elements. In this example, the total number of transceivers 16 is reduced from twenty to sixteen transceivers 16.

In alternative embodiments, the sub-arrays on an antenna need not have equal numbers of radiating elements. For example, an antenna may have sub-arrays with two radiating elements, three radiating elements, or more, or any combination thereof. Additionally, as in the example above, an antenna may contain combinations of transceivers coupled to sub-arrays and transceivers coupled to single radiating elements.

A transceiver coupled to a sub-array may be connected to the sub-array through a power dividing network 18. The power dividing network 18 may be designed to provide arbitrary power splitting, such that the various radiating elements receive different power levels. In other words the power can be split equally between the elements, or it can be split at some variable ratio. A transceiver consists of a transmitter and receiver. Therefore, the power dividing network 18 may also be considered to be a power combining network.

The power dividing networks 18 may also apply a phase difference between the radiating elements of the sub-array to provide a pre-tilt to the sub-array patterns. In one example, the sub-arrays may be biased for a 5 degree pre-tilt for a 0 to 10 degree tilt range for the entire antenna. This will help improve the sidelobes at the edges of the tilt range.

Figure 3:
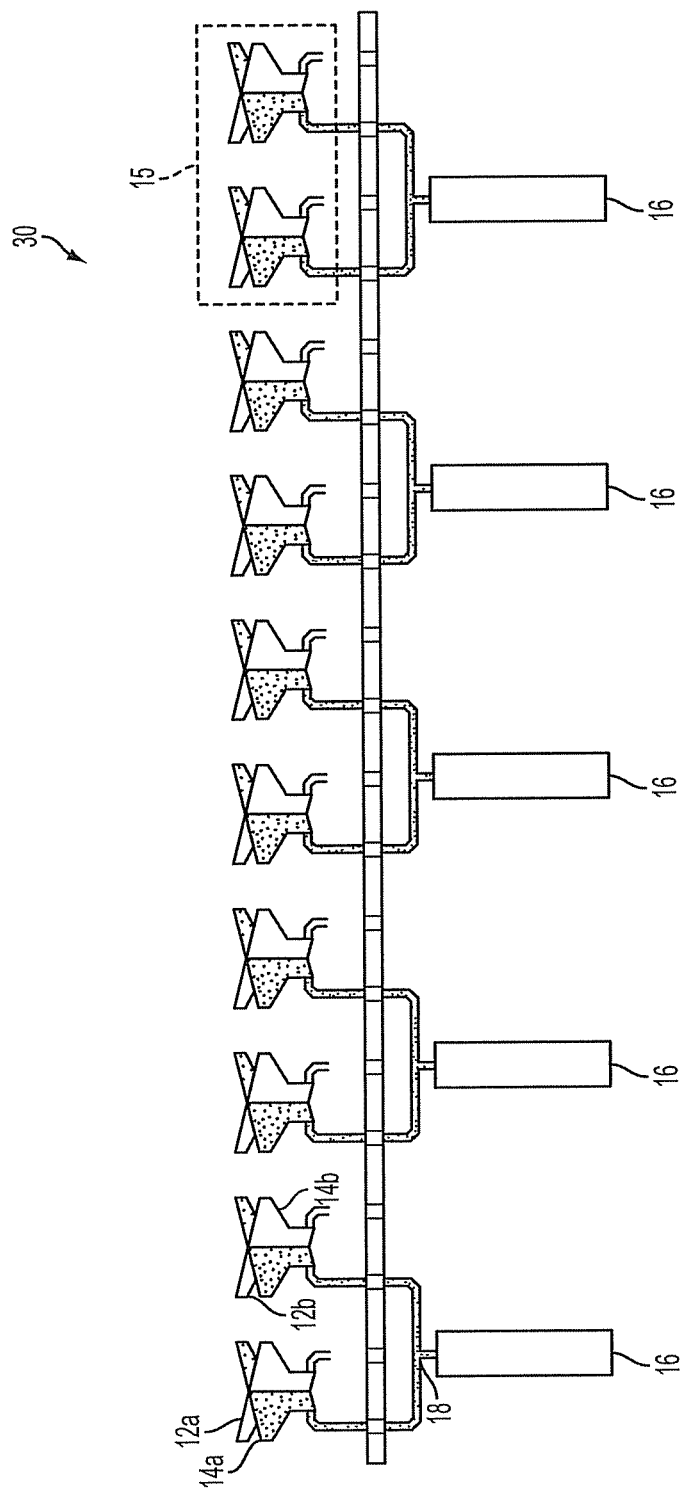
FIG. 3 illustrates an active antenna having a sub-array according to a second example of the present invention.

Referring to FIG. 3, alternatively, five sub-arrays of +45 degree radiating elements 12a may replace the 10 individual +45 degree radiating elements. Each sub-array may be coupled to a transceiver 16 through a power dividing network 18. In this example, there would also be five sub-arrays of −45 degree radiating elements, with each sub-array coupled to a transceiver 16 through a power divider/combiner. In this example, the total number of transceivers 16 is reduced from twenty to ten transceivers.

Figure 4A:
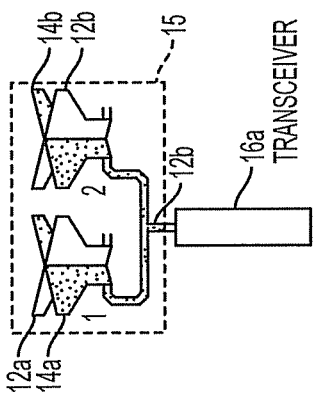
FIG. 4a-4d illustrates various embodiments of sub-arrays which may be employed in connection with the present invention.
Figure 4B:
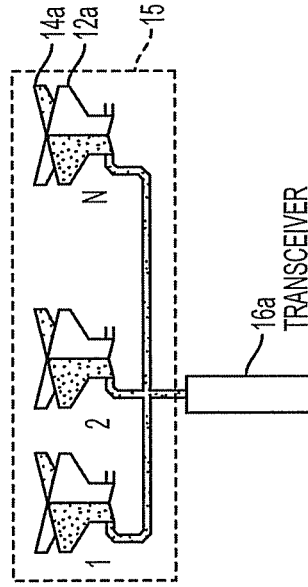
Figure 4C:
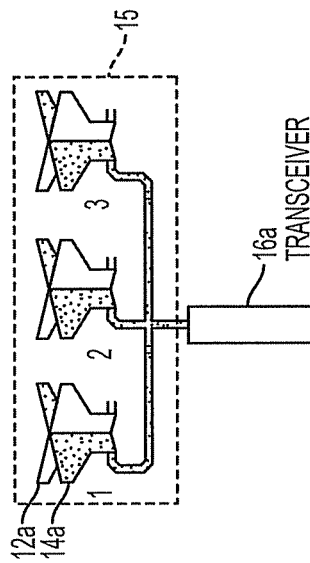
Figure 4D:
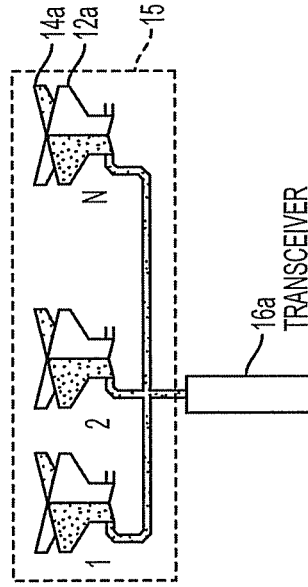

The invention is not limited to arrays having 10 dual-polarized radiating elements, and may be adapted to arrays of radiating elements have greater or fewer radiating elements, or elements of different polarizations. Additionally, referring to FIGS. 4a-4d, the sub-arrays are not limited to two radiating elements, but may comprise 3, 4 or more radiating elements. For example, FIG. 4a illustrates a conventional 1:1 relationship between a radiating element and a transceiver 16. FIG. 4b illustrates a transceiver shared between two radiating elements via a power divider network. FIG. 4c illustrates a transceiver 16 shared between three radiating elements via a power divider network 18. FIG. 4d illustrates the generic case of a transceiver 16 shared between N radiating elements via a power divider network. It is contemplated that sub-arrays having different numbers of radiating elements may be combined on the same antenna.

The reduction in transceiver count provided by the above examples of the present invention represents a considerable cost savings and improvement in reliability.

Figure 5:
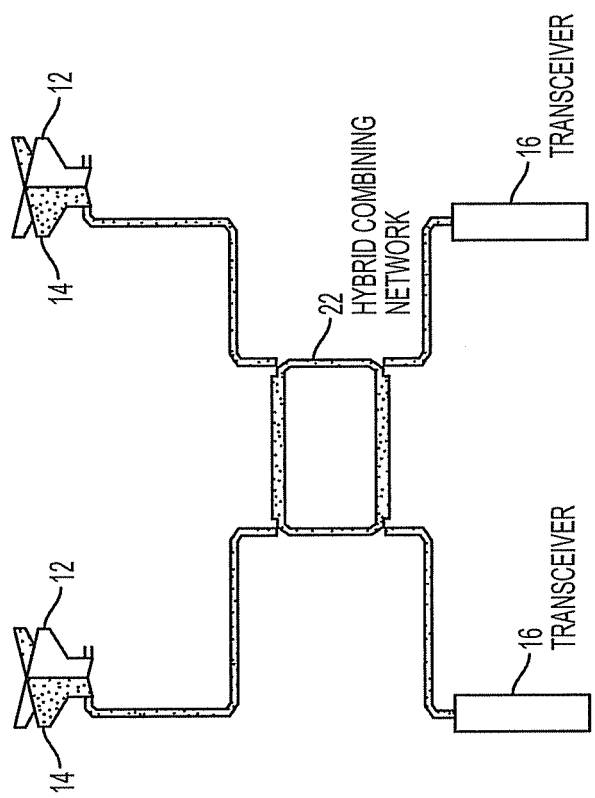
FIG. 5 illustrates an alternative structure for implementing sub-arrays according to the present invention.

In another aspect of the invention illustrated in FIG. 5, a first transceiver 16 may be coupled to a first radiating element 12 and a second radiating element 12 with a hybrid combining network 22. Additionally, a second transceiver 16 may be coupled to the first radiating element 12 and the second radiating element 12 with the same hybrid combining network 22. The coupling may be achieved with a Butler matrix. This example may be used to provide redundancy for amplifiers. In an active antenna, the redundancy of this example ensures that even if a transceiver 16 fails, all of the radiating elements continue to operate. The directivity of the antenna array is thereby maintained, and loss of effective isotropic radiated power ("EIRP") minimized.

Figure 6:
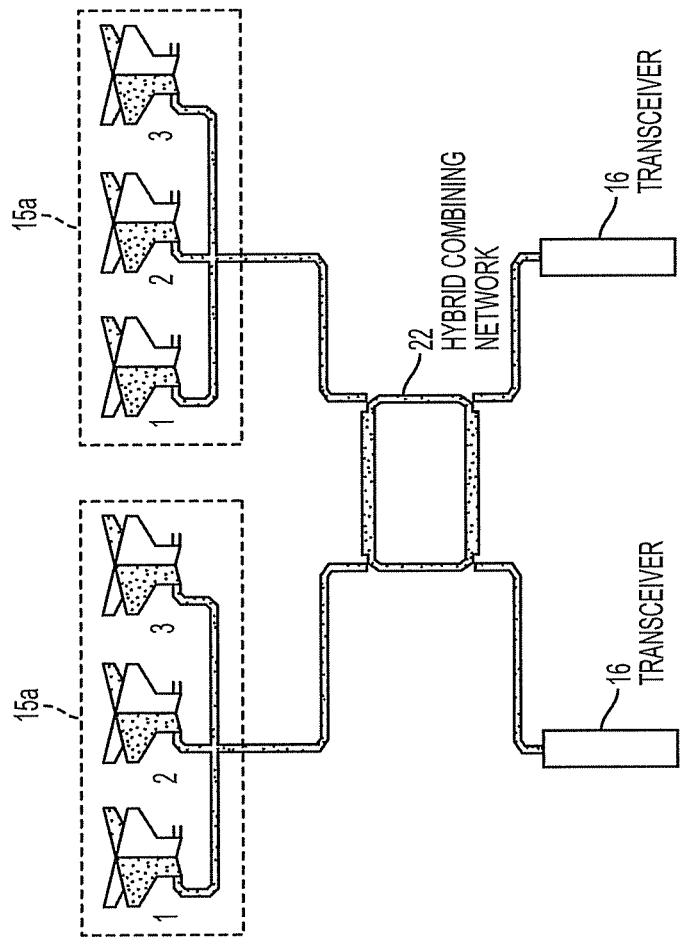
FIG. 6 illustrates another alternate structure for implementing sub-arrays accordingly to an aspect of the present invention.

Referring to FIG. 6, this aspect of the invention may be used in combination with sub-arrays, as described earlier. For example, a first transceiver 16 may be coupled to a first sub-array 12a and a second sub-array 12a with a hybrid combining network 22. Additionally, a second transceiver 16 may be coupled to the first sub-array 12a and the second sub-array 12a with the same hybrid combining network 22. The coupling may occur before the power combiner/divider network, or may be part of the power divider/combiner network. This example may be used to provide redundancy for amplifiers when sub-arrays are used.

In another aspect of the invention, the transceivers coupled to sub-arrays may be reconfigured in use to address transceiver failures in the field. In this example, an antenna may comprise a plurality of radiating elements in one or more arrays, and transceiver for each radiating element. Adjustments in the relationships between the phases of the radiating elements may steer the beam downward or upward.

If one transceiver fails, the phase relationships may be adversely affected. In one aspect of the present invention, the transceivers may be adjusted to compensate for the loss of the failed transceiver. In this example, "self healing" is effected by adjusting their phase (and, optionally, adjusting their amplitude) to synthesize a new elevation pattern that accommodates for the loss of a transceiver.

Figure 7:
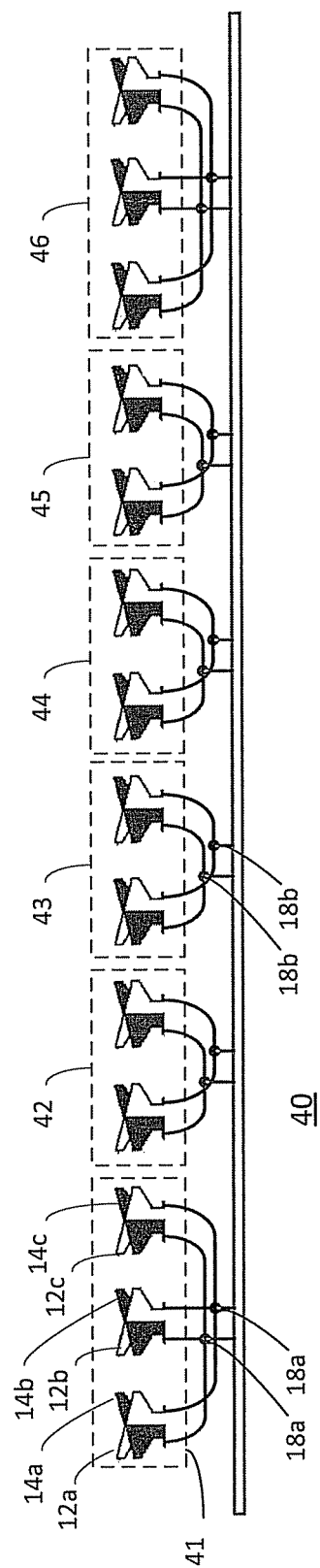
FIG. 7 illustrates an antenna having sub-arrays according to another example of the present invention.

FIG. 7 illustrates an example of a phased array antenna system that includes a total of fourteen antenna elements. These antenna elements are sub-divided into six sub-arrays 41-46. Sub-arrays 41 and 46 include three antennas elements and sub-arrays 42-45 include two antenna elements. In one example, the fourteen elements may be evenly spaced at 85 mm. As is known to those of skill in the art, the gain pattern of a phased array antenna system may be controlled by modifying the phase relationship between the elements in the array. The pattern may also be altered by altering the relative power levels of the signals provided to each element in the array.

Figure 8:
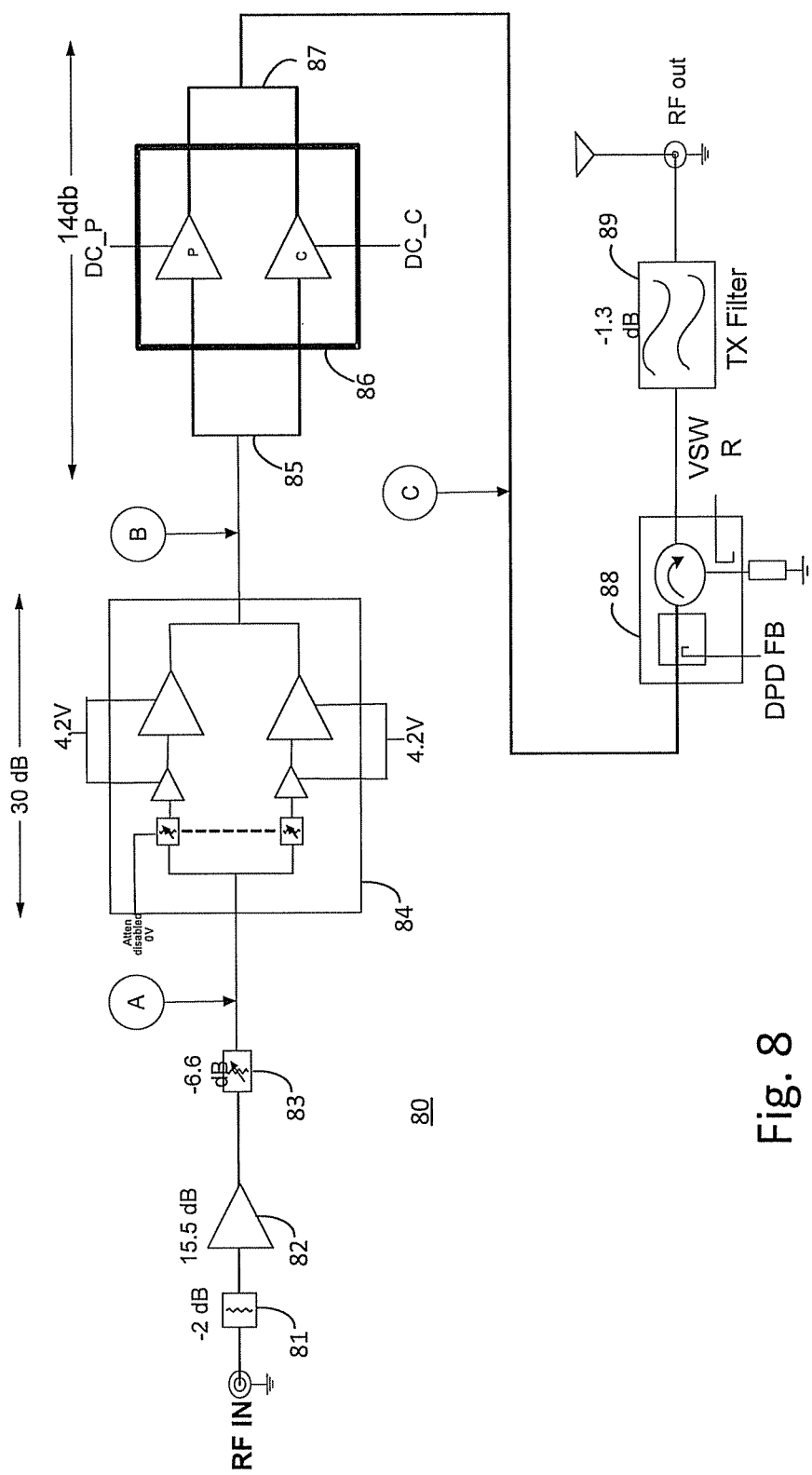
FIG. 8 is a schematic diagram of an amplification stage of an active radio that may be used in connection with sub-arrays according to the present invention.

FIG. 8 illustrates an amplifier stage 80 according to one example of the present invention. In this example, in normal operation, an overall gain of 49 dB is achieved from RF In to RF Out. In normal operation, RF In may have a signal level of −12 dBm. The RF signal passes through filter 81, amplifier 82, and filter 83. At Point A, the signal level would typically be −5.1 dBm. The RF signal then passes through a driver IC 84. In normal operation, 4.2 VDC is supplied to the driver IC 84. At Point B, after the driver IC 84, typically signal levels may be 24.9 dBm. The signal is split in hybrid 85, and amplified in amplifier 86. Power is provided to amplifier 86 by DC_P and DC_C. As explained below, DC_P and DC_C, under normal operation, may be 26 VDC. The signal is recombined in hybrid 87. At Point C, typical signal levels may be 38.9 dBm. The signal passes through isolator 88 and TX filter 89. At the output, typical signal levels for RF Out may be 36.7 dBm (approximately 4.7 w).

Figure 9:
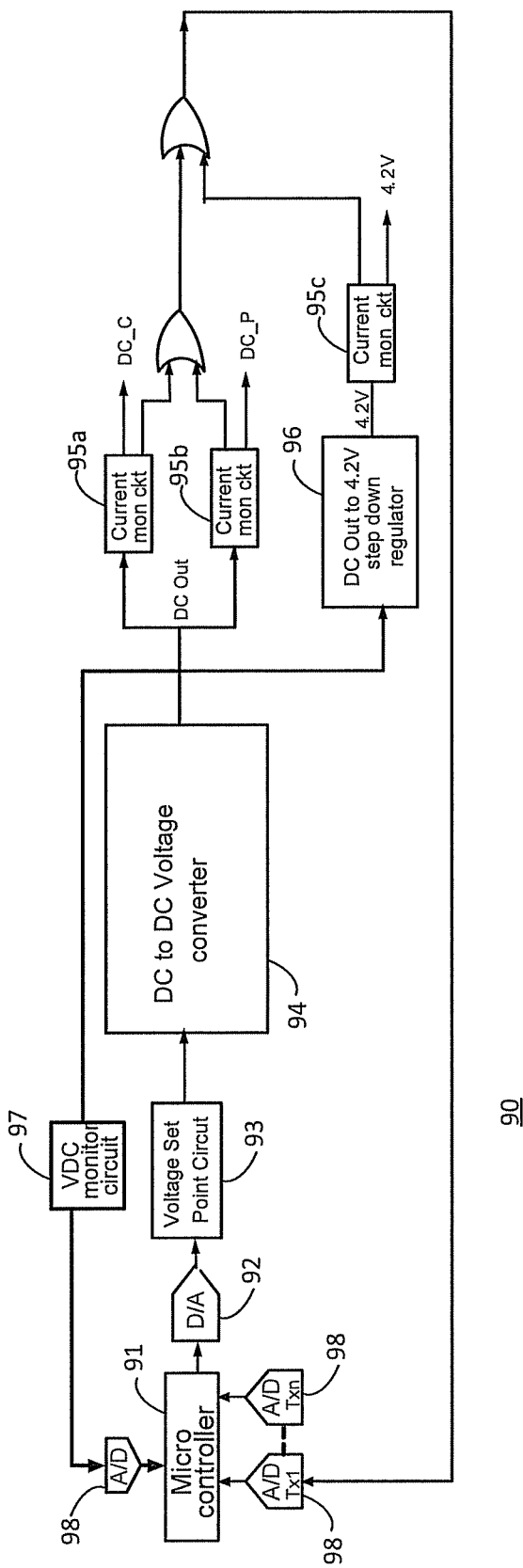
FIG. 9 is a block diagram of a power supply that may be used with the amplification stage of FIG. 8.

FIG. 9, illustrates one example of a DC power circuit 90 that supplies power to the Amplifier Stage 80 of FIG. 8. The DC power circuit 90 includes a micro controller 91, a digital to analog converter 92, a voltage set point circuit 93, and a DC to DC voltage converter 94. A path from the DC to DC voltage converter is provided by VDC monitor circuit 97 and an analog to digital converter 98. In normal operation, DC to DC voltage circuit may receive 48 VDC and the output of DC to DC voltage circuit 94, DC Out, may be configured to be 26 VDC. DC Out is provided to current monitor circuit 95a and current monitor circuit 95b. An output of current monitor circuit 95a, DC_C, is provided to one side of amplifier 86. An output of current monitor 95b, DC_C, is provided to the other side of amplifier 86. In normal operation, DC_C and DC_P are at 26 VDC, same as DC Out. DC Out is also provided to DC Out to 4.24 stepdown regulator 96, which provides 4.2 VDC to current monitor circuit 95c. The output of current monitor circuit 95c is provided to driver IC 84.

The current monitor circuits 95a, 95b include both a high current alarm and a low current alarm. Thus, the current monitor circuits 95a, 95b can detect both open circuit fail conditions and short circuit fail conditions of amplifier 86.

Pursuant to additional examples of the present invention, if a transceiver that powers a particular sub-array is lost (i.e., if the power amplifier for the transceiver fails), then the phase and/or power levels of the signals that are output by the other transceivers may be adjusted in order to attempt to provide an acceptable antenna pattern even after the loss of one sub-array. The following is one example of a multi-sub array antenna in a normal operating state, a failed state, and examples of recovered states.

One example of a normal operating state for the example of FIG. 7 is to have a first transceiver power the elements of first sub-array 41 at a relative amplitude of 0.58. The elements of second sub-array 42, may be powered at a relative amplitude of 0.71 by a second transceiver. The elements of third sub-array 43, may be powered at a relative amplitude of 0.71 by a third transceiver. The elements of fourth sub-array 44, may be powered at a relative amplitude of 0.71 by a fourth transceiver. The elements of fifth sub-array 45, may be powered at a relative amplitude of 0.71 by a fifth transceiver. The elements of sixth sub-array 46, may be powered at a relative amplitude of 0.58 by a sixth transceiver.

Each of the radiating elements may have different phase characteristics. In the above example, the three radiating elements of sub-array 41 may have phase coefficients of 38, 1, and −32. The two radiating elements of sub-array 42 may have phase coefficients of 12 and −21. The two radiating elements of sub-array 43 may have phase coefficients of 14 and −19. The two radiating elements of sub-array 44 may have phase coefficients of 22 and −11. The two radiating elements of sub-array 45 may have phase coefficients of 25 and −8. The three radiating elements of sub-array 46 may have phase coefficients of 35, 2 and −31. The phase coefficients given herein and elsewhere in this written description are given with respect to the configuration of FIG. 7, providing the coefficients for the individual radiating elements going from left-most to right-most. These phase coefficients provide an electrical tilt of zero degrees.

Figure 10:
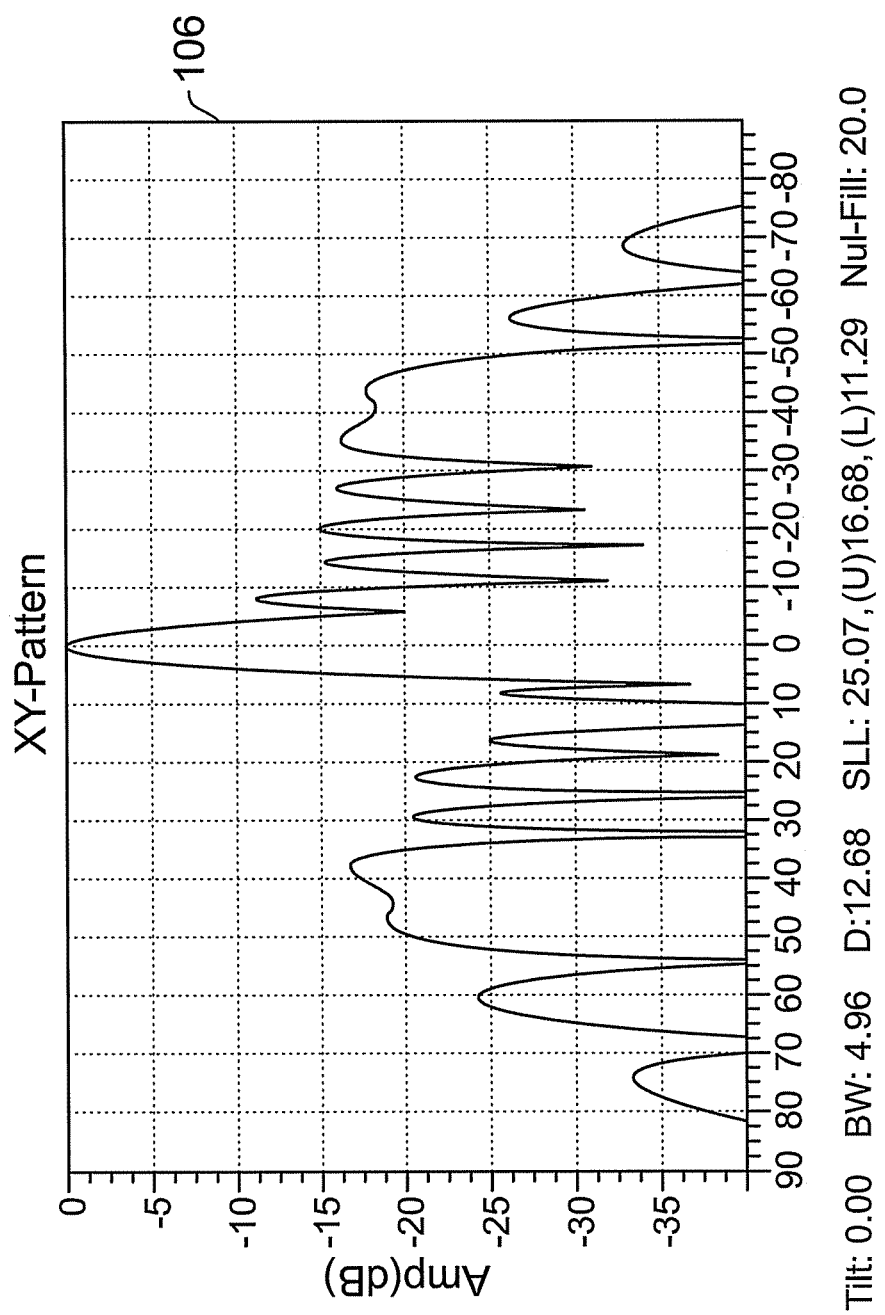
FIG. 10 is a vertical radiation pattern of the example of an antenna according to FIG. 7.

Radiating diagram 106 of FIG. 10 illustrates a simulated radiating pattern of the antenna, given the antenna array of FIG. 7, and the relative power levels and phase coefficients set forth above. In this example, the sub-arrays 41-46 are configured with fixed pre-phasing for seven degrees of downtilt. However, as described above, the phase coefficients are selected so that the sub-arrays provide no additional downtilt (e.g., zero degrees downtilt). Accordingly, the simulated pattern has a peak at zero degrees. Also, the side lobe suppression is more than 15 dB for all positive angles (suppression of downwardly angled side lobes is not as important, because downwardly angled sidelobes are directed into the ground).

Preferably, the antenna as described above provides 66.5 dBm EIRP. To achieve this specification, the power required at the radiating elements is 4.7 w per element in the normal state. Given the circuits illustrated in FIGS. 7 and 8, each power amplifier providing a gain of 14 dB operates at about 7.7 w.

Figure 11:
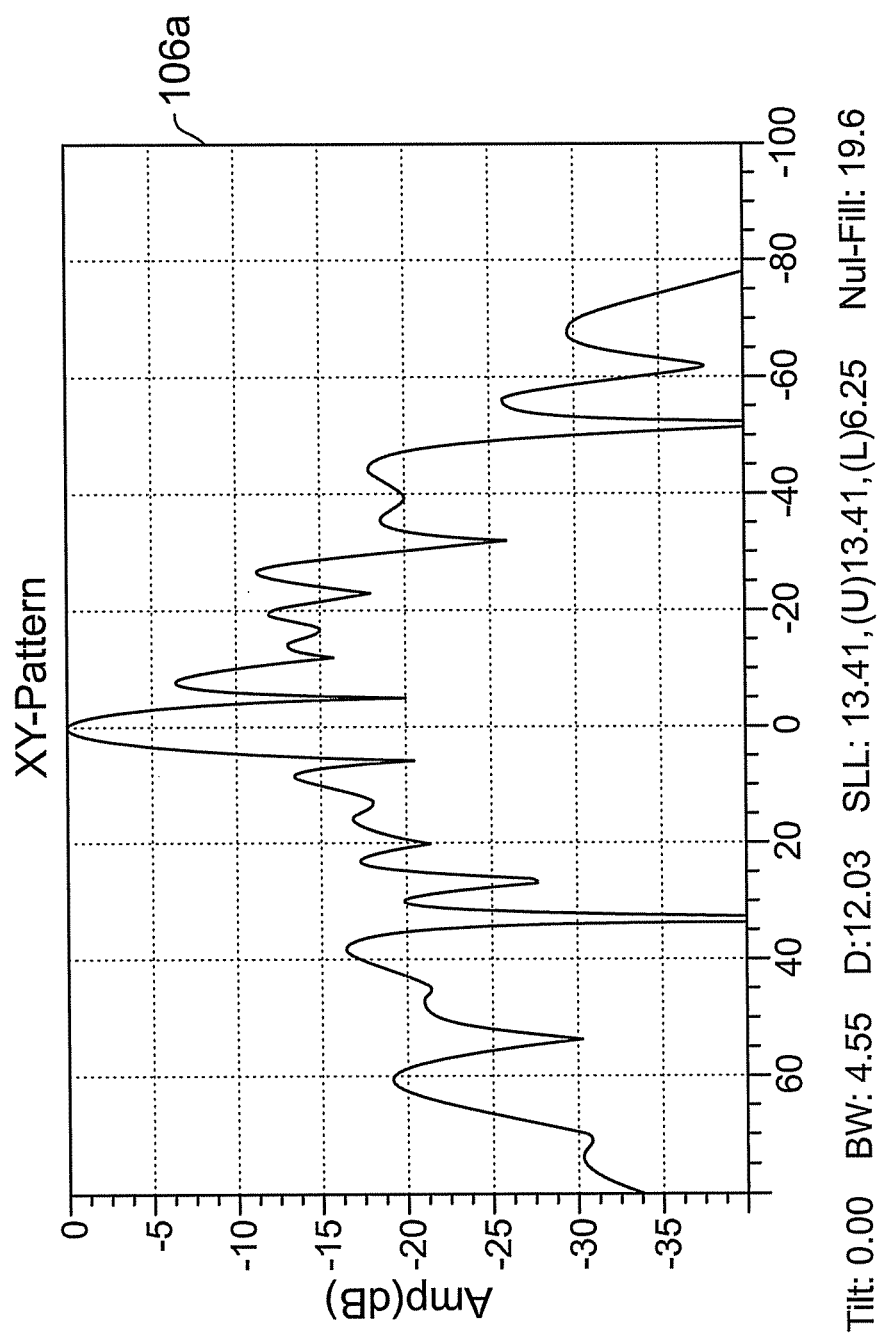
FIG. 11 is a vertical radiation pattern of the example of an antenna according to FIG. 7 when an amplification stage of one of the transceivers is in a failed state.

FIG. 11 illustrates how the situation changes if the power amplifier for the fourth sub-array 44 fails. As in FIG. 10, this configuration includes fixed pre-phasing of seven degrees downtilt and zero degrees of phased electrical downtilt. However, when the relative power of the signal supplied to sub-array 44 is set to zero to simulate a transceiver failure, antenna elements 8 and 9 become non-functional and the loss of sub-array 44 results in a change to the simulated antenna pattern in 106*a*. The loss of a transceiver may be detected by current monitors 95*a*, 95*b* which monitor the current provided to amplifier 86. Radiation pattern 106*a* in FIG. 11 illustrates a side lobe at about seven degrees above zero that exceeds −15 dB, which is undesirable antenna operation.

In order to compensate for this failure, the remaining active elements of the antenna array may be adjusted, both in terms of their phase and power inputs. In the particular example illustrated in FIG. 12, the pattern in radiation pattern radiation pattern 106*b* is improved as a result of two adjustments; an increase in absolute power and phase angle adjustment.

Regarding phase angles, the phases for the radiating elements may be adjusted as follows. The three radiating elements of sub-array 41 may have phase coefficients of 35, 2, and −31. The two radiating elements of sub-array 42 may have phase coefficients of −2 and −35. The two radiating elements of sub-array 43 may have phase coefficients of −2 and −35. The two radiating elements of sub-array 44 (the failed sub-array) may have arbitrary phase coefficients. The two radiating elements of sub-array 45 may have phase coefficients of 25 and −8. The three radiating elements of sub-array 46 may have phase coefficients of 27, −6 and −39.

Another consequence of the transceiver failure is a loss of EIRP. Given the above scenario (one transceiver fails), an antenna that has been re-optimized for directivity requires the radiating elements to be driven at approximately 7.2 w per element remaining in service. This requires an absolute adjustment in power.

Referring to FIG. 8, RF In may be increased from −12 dBm to −10.2 dBm. This also increases the power level at Point A to −3.3 dBm and Point B to 26.7 dBm. To allow the amplifier to continue to provide 14 dB gain at the increased power at Point B, the voltage supplied to amplifier 86, DC_P and DC_C, is increased from 26 VDC to 28 VDC. This is accomplished by adjusting micro controller 91 and voltage set point circuit 93 such that DC to DC voltage converter outputs a DC Out voltage of 28 volts. The power level at Point C is 40.3 dBm, and the power level for RF Out is 38.6 dBm. This represents a power output of 7.2 w. In this example, about 1.9 dB of headroom in the amplifier 86 is required to re-establish EIRP to the desired level.

In this example, the relative power levels are not adjusted. The elements of first sub-array 41 continue to have a relative amplitude of 0.58. The elements of second sub-array 42 may be powered at a relative amplitude of 0.71 by a second transceiver. The elements of third sub-array 43 may be powered at a relative amplitude of 0.71 by a third transceiver. The fourth sub-array 44 has a failed transceiver, so its relative amplitude is zero. The elements of fifth sub-array 45 may be powered at a relative amplitude of 0.71 by a fifth transceiver. The elements of sixth sub-array 46 may be powered at a relative amplitude of 0.58 by a sixth transceiver.

Figure 12:
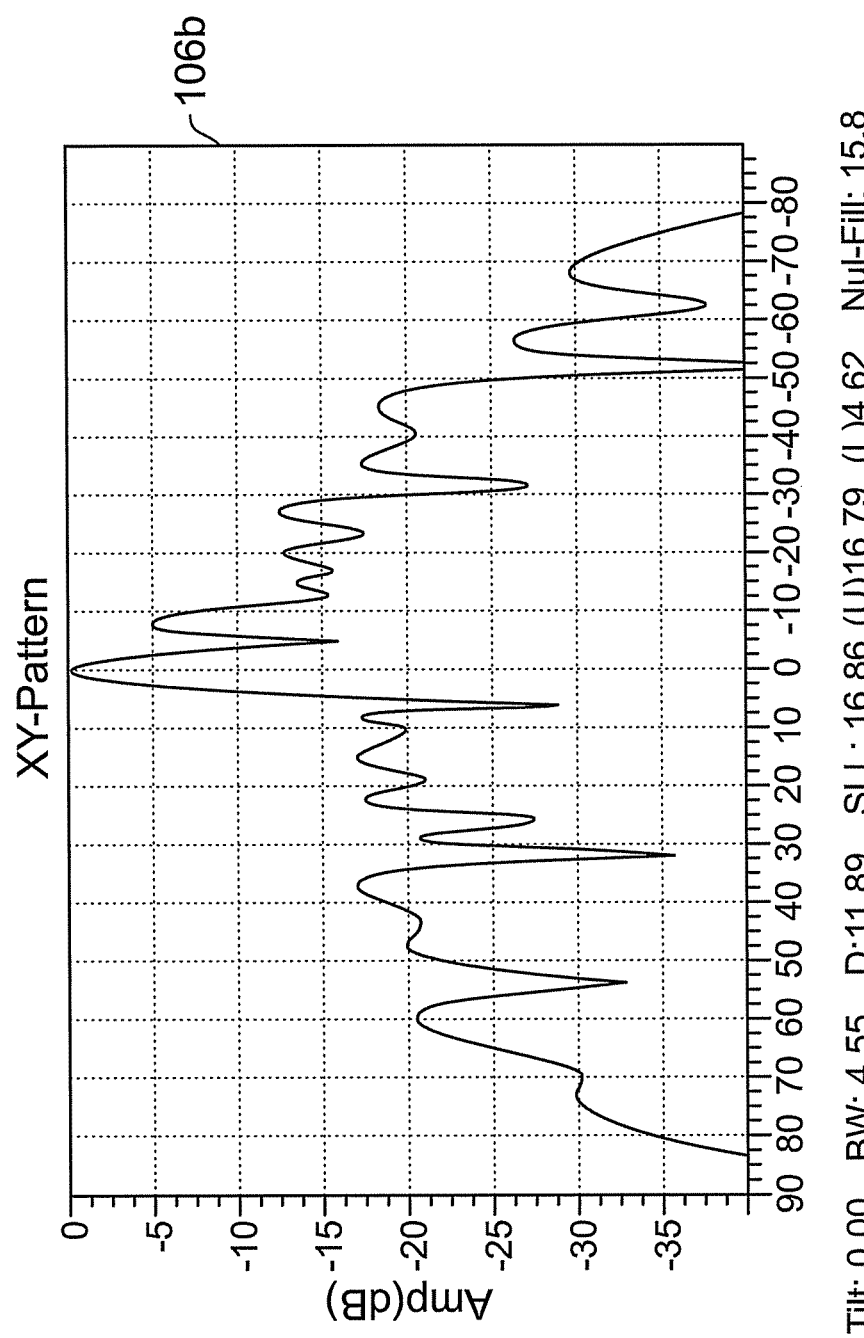
FIG. 12 is a vertical radiation pattern of the example of an antenna according to FIG. 7 when an amplification stage of one of the transceivers is in a failed state and phase optimization is applied to recover from the failure.

The result of absolute power adjustment and phase angle adjustment is illustrated in radiation pattern 106*b* (FIG. 12). Side lobe suppression exceeds −15 dBm for all positive angles with respect to the main antenna beam, and acceptable performance is restored.

In a further example, both absolute power adjustment (as described above) and relative power adjustments may be made. The elements of first sub-array 41 may be powered at a relative amplitude of 0.35 by the first transceiver. The elements of second sub-array 42 may be powered at a relative amplitude of 0.41 by the second transceiver. The elements of third sub-array 43 may be powered at a relative amplitude of 0.52 by the third transceiver. The fourth sub-array 44 has a failed transceiver, so its relative amplitude is zero. The elements of fifth sub-array 45 may be powered at a relative amplitude of 0.40 by the fifth transceiver. The elements of sixth sub-array 46 may be powered at a relative amplitude of 0.32 by the sixth transceiver.

Regarding phase angles, when adjusting for both absolute power levels and relative power levels, the phases for the radiating elements may be adjusted as follows. The three radiating elements of sub-array 41 may have phase coefficients of 2, −31, and −64. The two radiating elements of sub-array 42 may have phase coefficients of −26 and −60. The two radiating elements of sub-array 43 may have phase coefficients of −29 and −62. The two radiating elements of sub-array 44 (the failed sub-array) may have arbitrary phase coefficients. The two radiating elements of sub-array 45 may have phase coefficients of −4 and −37. The three radiating elements of sub-array 46 may have phase coefficients of −3, −36 and −69.

Figure 13:
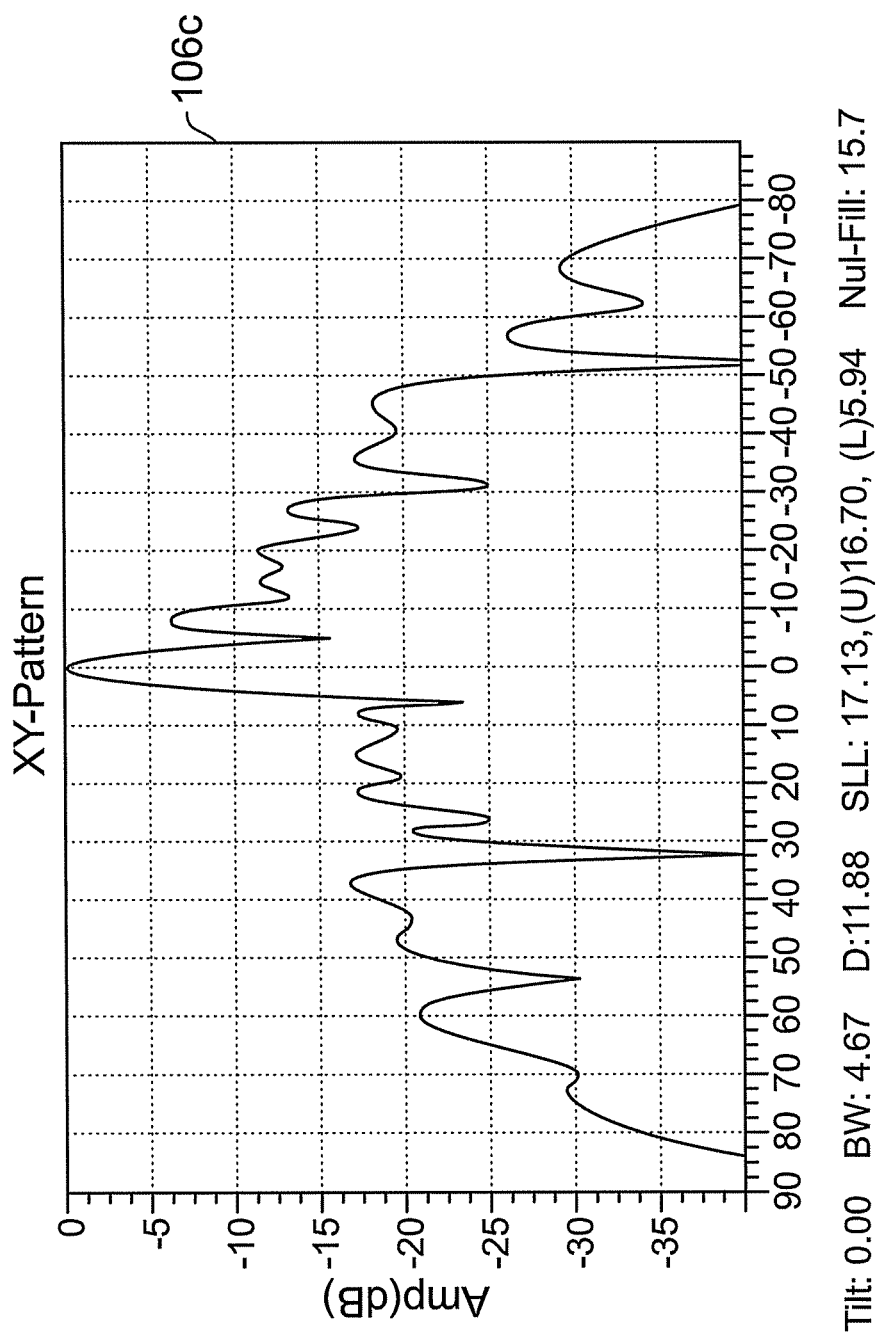
FIG. 13 is a vertical radiation pattern of the example of an antenna according to FIG. 7 when an amplification stage of one of the transceivers is in a failed state and phase optimization and relative power adjustments are applied to recover from the failure.

The result is a pattern as shown in FIG. 13 as radiation pattern 106*c*. This resulted in an improved antenna pattern, and acceptable performance is restored.

The invention is not limited to the above examples. The invention is applicable to various amounts of fixed pre-phasing tilt and adjustable phase downtilt. For example, phase and power adjustments may be made to restore 15 dB SLL performance of antennas having failed transceivers when the antennas are configured for various amounts of downtilt.

In one example involving additional downtilt, the phase coefficients for the radiating elements are adjusted to provide about five degrees of electrical downtilt. In this example, the three radiating elements of sub-array 41 may have phase coefficients of about 108, 75, and 42. The two radiating elements of sub-array 42 may have phase coefficients of about 19 and −13. The two radiating elements of sub-array 43 may have phase coefficients of about −24 and −56. The two radiating elements of sub-array 44 may have phase coefficients of about −61 and −94. The two radiating elements of sub-array 45 may have phase coefficients of about −105 and −138. The three radiating elements of sub-array 46 may have phase coefficients of about −160, −194 and −227.

In a normal operating state for this example, the first transceiver powers the elements of first sub-array 41 at a relative amplitude of 0.58. The elements of second sub-array 42 may be powered at a relative amplitude of 0.71 by the second transceiver. The elements of third sub-array 43 may be powered at a relative amplitude of 0.71 by the third transceiver. The elements of fourth sub-array 44 may be powered at a relative amplitude of 0.71 by the fourth transceiver. The elements of fifth sub-array 45 may be powered at a relative amplitude of 0.71 by the fifth transceiver. The elements of sixth sub-array 46 may be powered at a relative amplitude of 0.58 by the sixth transceiver.

Figure 14:
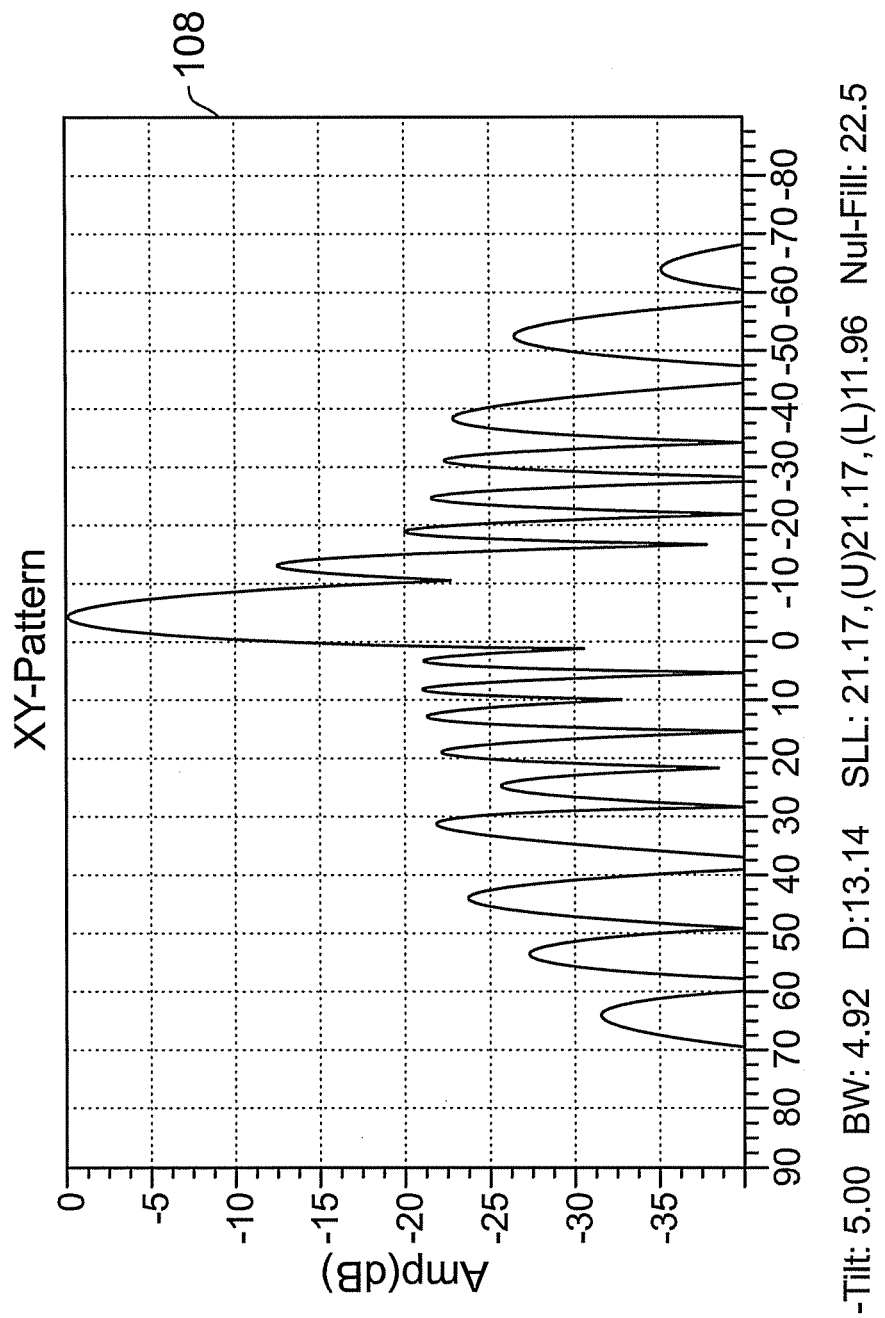
FIG. 14 is a vertical radiation pattern of the example of an antenna according to FIG. 7 when configured with five degrees of downtilt.

Radiating diagram 108 of FIG. 14 illustrates a simulated radiating pattern of the antenna, given the antenna array of FIG. 7, and the relative power levels and phase coefficients set forth above. In this example, the sub-arrays 41-46 are configured with fixed pre-phasing for seven degrees of downtilt. However, as described above, the phase coefficients are selected so that the sub-arrays provide five degrees of additional downtilt. Accordingly, the simulated pattern has a peak at about −5 degrees. Also, the side lobe suppression is more than 15 dB for all positive angles.

Figure 15:
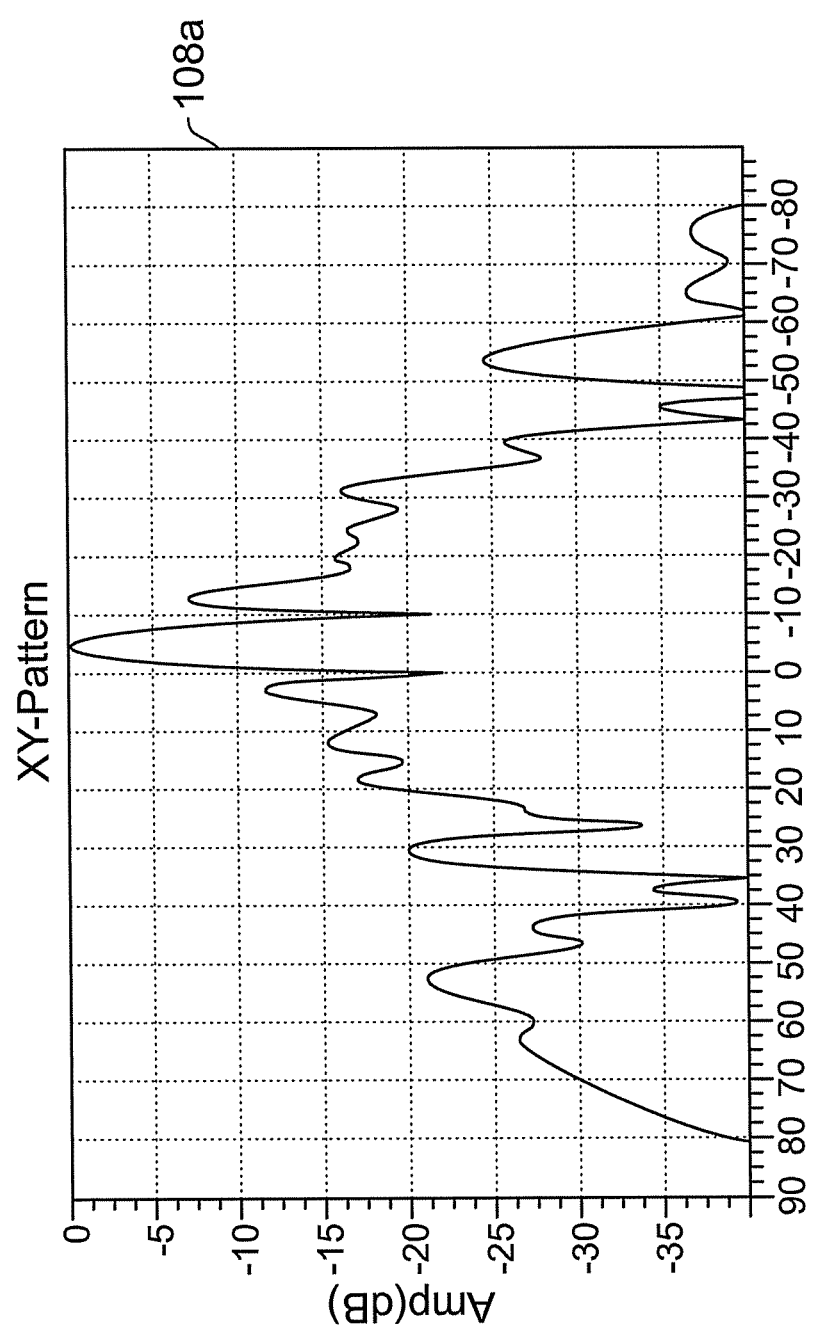
FIG. 15 is a vertical radiation pattern of the example of an antenna according to FIG. 7 when configured with five degrees of downtilt and when an amplification stage of one of the transceivers is in a failed state.

FIG. 15 illustrates how the situation changes if the power amplifier for the fourth sub-array 44 fails. As in FIG. 10, this configuration includes fixed pre-phasing of seven degrees downtilt and five degrees of phased electrical downtilt. However, when the relative power of the signal supplied to sub-array 44 is set to zero to simulate a transceiver failure, antenna elements 8 and 9 become non-functional and the loss of sub-array 44 results in a change to the simulated antenna pattern in 108*a*. In particular, a side lobe at about three degrees above zero exceeds −15 dB, which is undesirable antenna operation.

In order to compensate for this failure, the remaining active elements of the antenna array may be adjusted, both in terms of their phase and power inputs. In the particular example illustrated in FIG. 16, the improved pattern in radiation pattern radiation pattern 108*b* is the result of two adjustments; an increase in absolute power and phase angle adjustment. Regarding absolute adjustment, the description above referring to FIG. 8 is incorporated by reference. In this example, the relative power levels are not adjusted.

Regarding phase angles, the phases for the radiating elements may be adjusted as follows. The three radiating elements of sub-array 41 may have phase coefficients of about 45, 12 and −20. The two radiating elements of sub-array 42 may have phase coefficients of about −60 and −93. The two radiating elements of sub-array 43 may have phase coefficients of about −112 and −146. The two radiating elements of sub-array 44 (the failed sub-array) may have arbitrary phase coefficients. The two radiating elements of sub-array 45 may have phase coefficients of about −170 and −202. The three radiating elements of sub-array 46 may have phase coefficients of about −233, −266 and −299.

Figure 16:
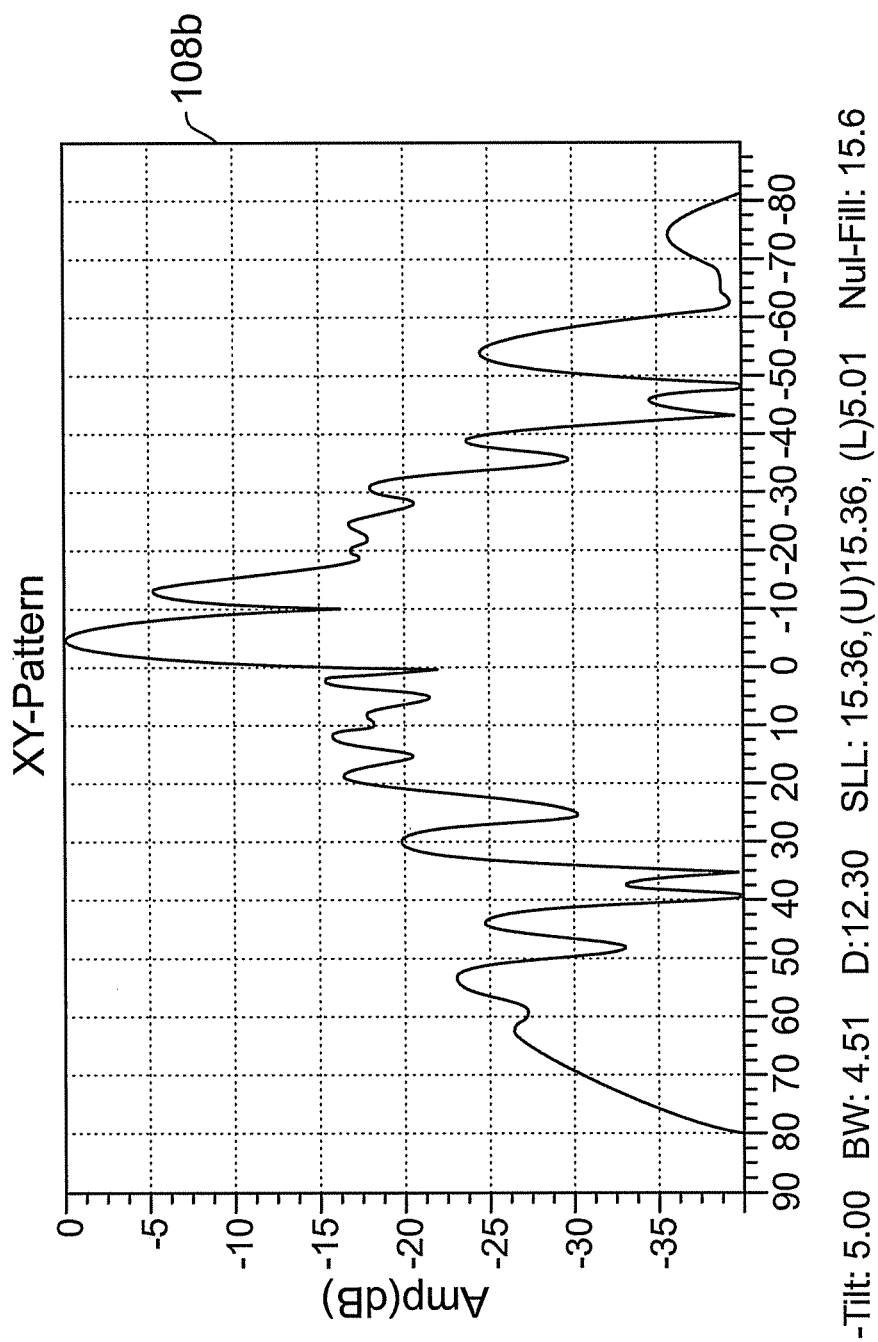
FIG. 16 is a vertical radiation pattern of the example of an antenna according to FIG. 7 when configured with five degrees of downtilt and when an amplification stage of one of the transceivers is in a failed state and phase optimization is applied to recover from the failure.

The result of absolute power adjustment and phase angle adjustment is illustrated in radiation pattern 108*b* (FIG. 16). Side lobe suppression is restored, and exceeds −15 dBm for all positive angles with respect to the main antenna beam.

In a further example, both absolute power adjustment (as described above) and relative power adjustments may be made. The elements of first sub-array 41 may be powered at a relative amplitude of 0.61 by the first transceiver. The elements of second sub-array 42 may be powered at a relative amplitude of 0.73 by the second transceiver. The elements of third sub-array 43 may be powered at a relative amplitude of 0.84 by the third transceiver. The fourth sub-array 44 has a failed transceiver, so its relative amplitude is zero. The elements of fifth sub-array 45 may be powered at a relative amplitude of 0.55 by the fifth transceiver. The elements of sixth sub-array 46 may be powered at a relative amplitude of 0.48 by the sixth transceiver.

Regarding phase angles, when the relative power levels are adjusted, the phases for the radiating elements may be adjusted as follows. The three radiating elements of sub-array 41 may have phase coefficients of about 186, 153, and 120. The two radiating elements of sub-array 42 may have phase coefficients of about 89 and 56. The two radiating elements of sub-array 43 may have phase coefficients of about 34 and 1. The two radiating elements of sub-array 44 (the failed sub-array) may have arbitrary phase coefficients. The two radiating elements of sub-array 45 may have phase coefficients of about −22 and −55. The three radiating elements of sub-array 46 may have phase coefficients of about −88, −121 and −154.

Figure 17:
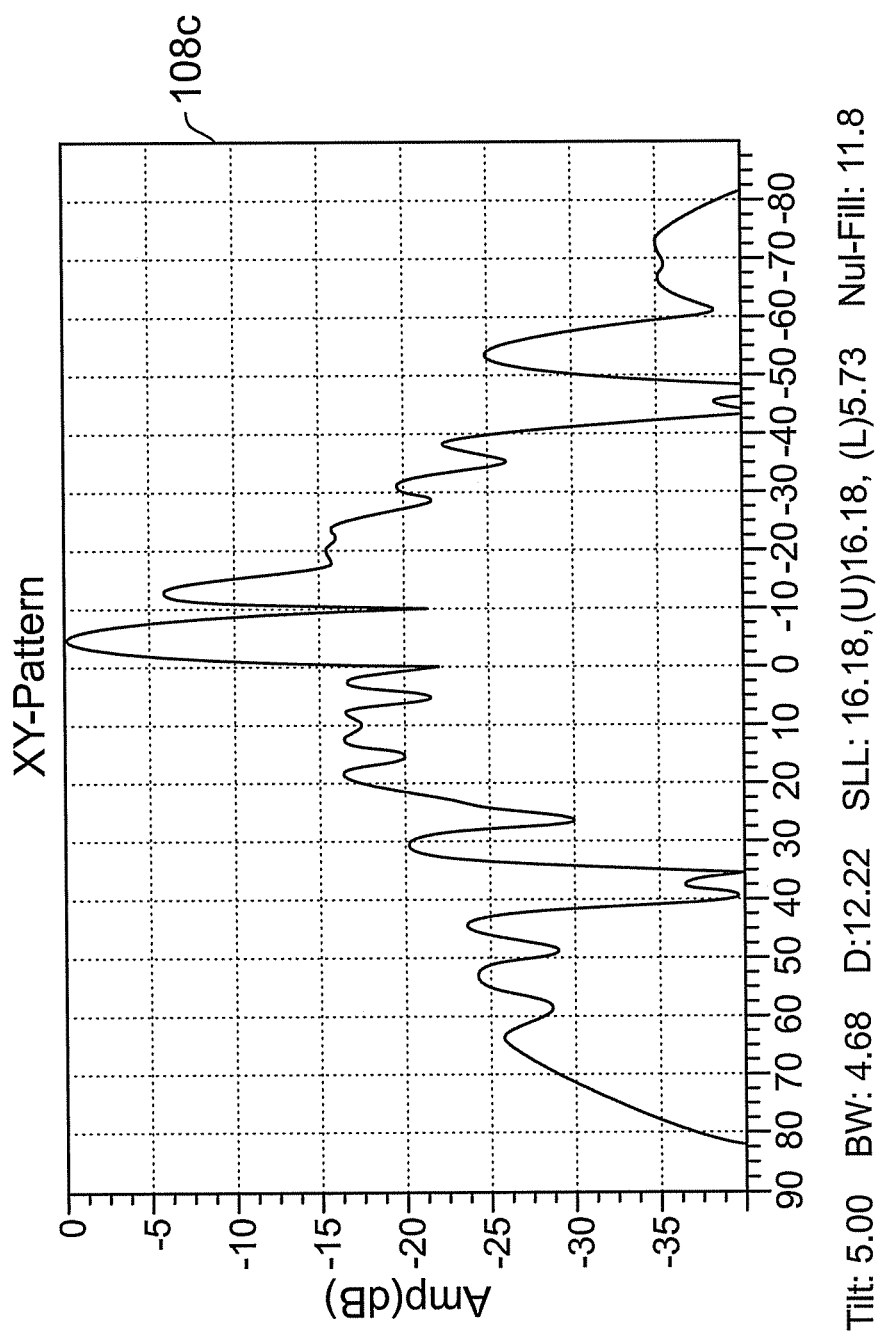
FIG. 17 is a vertical radiation pattern of the example of an antenna according to FIG. 7 when configured with five degrees of downtilt and when an amplification stage of one of the transceivers is in a failed state and phase optimization and relative power adjustments are applied to recover from the failure.

The result is a pattern as shown in FIG. 17 as radiation pattern 108*c*. Side lobes above zero degrees are suppressed below −15 dB, and acceptable performance is restored.

The invention may also be applied to different angles of pre-tilt and/or electrical down-tilt. The objectives are met for the baseline case with all amplifiers operational. In certain examples illustrated above, phase adjustment may be sufficient to restore acceptable performance in the event of an amplifier failure. However, providing both phase optimization and relative amplitude optimization provides additional margin for SLL.

For these patterns, all sub-arrays have fixed pre-phasing which steers the sub-arrays for 7 degrees downtilt. This helps optimize the larger downtilt patterns while trading off some performance at zero degrees of electrical tilt, where there is more margin. Different pre-phasing on the 3 and the 2 element sub-arrays can also be applied, and possibly the element spacings can be dithered about the nominal 85 mm in order to reduce effect of quantization lobes.

Pursuant to embodiments of the present invention described above, antenna systems are provided that use sub-arrays to reduce the number of amplifiers/transceivers, which can reduce system cost. Moreover, in the event of a failure of a transceiver/power amplifier, the output power of the other power amplifiers in the antenna system can be increased to both increase the overall output power and/or to optimize the antenna pattern subsequent to the failure. In effect, the antenna system can repair itself by reoptimizing the amplitudes and phases of the remaining amplifiers. There may be some degradation in SLL and directivity as compared to the original patterns, but generally there is much improvement compared to the case with the failed amplifier where reoptimization is not performed.

In other embodiments, 7 identical 7×2 element sub-arrays may be used, which may increase the level of quantization lobes slightly. However, mixing 3 groups with 2 can give some modest improvement to the quantization lobe by breaking up the periodicity of the phase quantization errors. A bigger driver in reducing from 7 sub-arrays to 6 sub-arrays, however, may be to reduce overall cost.

Other ways to possibly reduce quantization errors may include using different amounts of pre-tilt on the sub-array boards to dither the phase errors, for example, not so periodic. Another way is to add random errors to the array spacing so it is not the uniform 85 mm between each element. Note these methods make each sub-array board unique, thus increasing unique part count. The pretilt and the spacing on the 3 element sub-arrays may be different than that for the 2-element feedboards since those are already unique.

The present invention is described herein with reference to the accompanying drawings, in which embodiments of the invention are shown. This invention may, however, be embodied in many different forms and should not be construed as limited to the embodiments set forth herein. For example, the present invention is not necessarily limited to active antenna arrays used in cellular communications networks, but may also be used in other antenna systems involving arrays of relating elements driven by a plurality of transceivers. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Many different embodiments are disclosed herein, in connection with the description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and sub combinations of the embodiments described herein, and of the manner and process of making and using them, and shall support claims to any such combination or subcombination.

In the specification, there are disclosed embodiments of the invention and, although specific terms are employed, they are used in a generic and descriptive sense only and not for purposes of limitation. The following claim is provided to ensure that the present application meets all statutory requirements as a priority application in all jurisdictions and shall not be construed as setting forth or limiting the scope of the present invention.

What is claimed is:

1. An antenna having a radiation pattern comprising:
a plurality of sub-arrays, each sub-array including a power divider/combiner network, a first radiating element coupled to a first port of the power divider/combiner network, a second radiating element coupled to a second port of the power divider/combiner network, and a first transceiver from a plurality of transceivers coupled to a third port of the power divider/combiner network, wherein the power divider/combiner network selectively couples the first transceiver to either the first radiating element or the second radiating element and selectively couples a second transceiver that is coupled to a fourth port of the power divider/combiner network to either the first radiating element or the second radiating element; the antenna further comprising
an adjusting circuit which is coupled to and monitors at least some of the plurality of transceivers to detect at least one transceiver that is in a failure state due to one of a short circuit condition and an open circuit condition, wherein the adjusting circuit adjusts the radiation pattern of the antenna to compensate for the at least one transceiver that is in the failure state by modifying performance characteristics of at least one transceiver of the plurality of transceivers that is in a non-failed state;
wherein a first sub-array of the plurality of sub-arrays is located at a first end of the antenna, and a second sub-array of the plurality of sub-arrays is located at a second end of the antenna,
wherein modifying performance characteristics of the at least one transceiver in the non-failed state comprises adjusting at least a phase of a signal output by the at least one transceiver in the non-failed state to synthesize a beam pattern for the antenna that has a new elevation pattern that accommodates for a loss of the at least one transceiver in the failure state.

2. The antenna of claim 1, further comprising at least one transceiver of the plurality of transceivers coupled to only a single radiating element located between the first sub-array and the second sub-array.

3. The antenna of claim 1, wherein the power divider/combiner networks apply a phase difference between the first radiating element and second radiating element of a sub-array to provide a pre-tilt to radiating patterns of the sub-array and wherein the adjusting circuit adjusts phase of a least one transceiver to adjust the radiation pattern.

4. The antenna of claim 1, wherein the antenna further comprises a plurality of intermediate sub-arrays disposed between the first sub-array and the second sub-array, wherein the first and second sub-arrays transmit less power than at least one of the intermediate sub-arrays and wherein the intermediate sub-arrays comprise two radiating elements coupled to a power dividing network and a transceiver coupled to the power dividing network.

5. The antenna of claim 1, wherein the adjusting circuit further comprises an adjustable power supply coupled to each transceiver, the adjustable power supply having current monitors to detect at least one failure state of a transceiver, and a power compensation mode to adjust absolute power to a transceiver in a non-failed state to improve at least one of power output and radiation pattern of the antenna to compensate for the failure state.

6. The antenna of claim 5, wherein the adjustable power supply provides a first voltage in normal operation and a second voltage, where the second voltage is higher than the first voltage in power compensation mode.

7. The antenna of claim 1, wherein the adjusting circuit includes at least one current monitor.

8. The antenna of claim 1, wherein modifying performance characteristics of the at least one transceiver in a non-failed state comprises increasing an absolute power provided to the plurality of transceivers without modifying a relative power provided to the transceivers other than the at least one transceiver in a failure state.

9. The antenna of claim 1, wherein modifying performance characteristics of the at least one transceiver in a non-failed state comprises increasing an absolute power provided to the plurality of transceivers and modifying a relative power provided to the transceivers.

10. The antenna of claim 1, wherein modifying performance characteristics of the at least one transceiver in a non-failed state comprises increasing an absolute power provided to the plurality of transceivers without modifying a relative power provided to the transceivers other than the at least one transceiver in a failure state.

11. The antenna of claim 1, wherein the first sub-array of the plurality of sub-arrays comprises a first spacing between the first radiating element of the first sub-array and the second radiating element of the first sub-array, and wherein the second sub-array of the plurality of sub-arrays comprises a second spacing between the first radiating element of the second sub-array and the second radiating element of the second sub-array, wherein the first spacing differs from the second spacing.

12. The antenna of claim 11, wherein the first spacing and the second spacing are selected randomly.

* * * * *